United States Patent [19]

Sabel

[11] Patent Number: 5,539,751
[45] Date of Patent: Jul. 23, 1996

[54] DEMULTIPLEXER SYNCHRONIZER

[75] Inventor: Lesley P. Sabel, Cheltenham, Australia

[73] Assignee: The Commonwealth of Australia of C/-The Secretary of Defence, Canberra, Australia

[21] Appl. No.: 307,839

[22] PCT Filed: Mar. 31, 1993

[86] PCT No.: PCT/AU93/00136

§ 371 Date: Sep. 29, 1994

§ 102(e) Date: Sep. 29, 1994

[87] PCT Pub. No.: WO93/20627

PCT Pub. Date: Oct. 14, 1993

[30] Foreign Application Priority Data

Mar. 31, 1992 [AU] Australia ................... PL1604

[51] Int. Cl.[6] ........................................ H04J 3/06
[52] U.S. Cl. ................ 370/105.4; 370/112; 375/368
[58] Field of Search ......................... 370/100.1, 105, 370/105.1, 105.4, 106, 107, 112, 104.1; 375/106, 114, 116, 115, 354, 365, 368, 367

[56] References Cited

U.S. PATENT DOCUMENTS

| | | | |
|---|---|---|---|
| 3,575,554 | 4/1971 | Schmidt | 375/14 |
| 3,883,729 | 5/1975 | de Cremiers | 370/105.4 |
| 4,112,498 | 9/1978 | Reiner et al. | 370/104.1 |
| 4,598,413 | 7/1986 | Szechenyi | 375/116 |
| 4,860,323 | 8/1989 | Malter | 370/105.1 |
| 4,878,229 | 10/1989 | Szechenyi | 375/114 |
| 4,930,125 | 5/1990 | Bains | 370/105 |
| 5,148,453 | 9/1992 | Newby et al. | 370/105.4 |
| 5,177,740 | 1/1993 | Toy et al. | 370/100.1 |
| 5,373,507 | 12/1994 | Sköld | 370/105.1 |

FOREIGN PATENT DOCUMENTS 1212723 10/1986 Canada.

Primary Examiner—Hassan Kizou
Attorney, Agent, or Firm—Cushman Darby & Cushman

[57] ABSTRACT

A method and apparatus for establishing and maintaining synchronization of a demultiplexer for use with a digital transmissions system. The invention utilizes a repetitive synchronization pattern which may be interleaved within a frame or inserted as a block at a particular point within a frame. Frames of words including at least one synchronization bit and at least one data bit are received. The received synchronization bit or bits of a frame or frame or frames is cross correlated with the expected value of the respective bit or bits. A synchronization signal is formed by summing the cross correlation values. It is then compared with a threshold signal to indicate the state of synchronization.

6 Claims, 5 Drawing Sheets

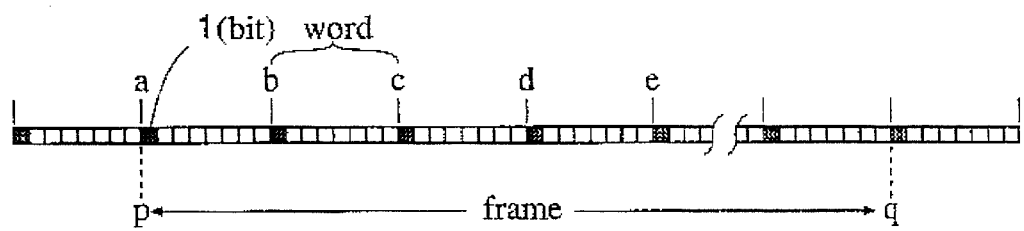
FIG 1
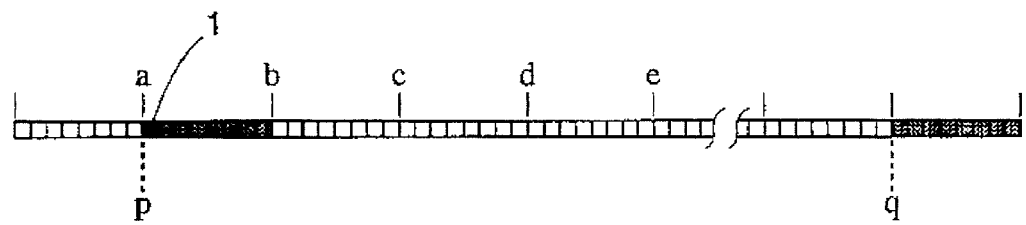
FIG 2
FIG 3

DEMULTIPLEXER SYNCHRONIZER

TECHNICAL FIELD

The invention described herein relates to establishing and maintaining synchronisation of a demultiplexer. for use with a data transmission system. A demultiplexer is part of the receiving system of a data transmission system.

BACKGROUND ART

The known types of transmission systems for which this invention is useful involve the transmission of data frames including at least one synchronisation word and at least one data word. The synchronisation word or words are repetitively transmitted and are ordered within each frame in a selected fashion.

A frame is a set of words where each word is a set of symbols. The symbols, often known as "bits", are used to represent information or data, as well as being used to synchronise the demultiplexer with the received data. Once a frame is transmitted another frame composed of the same number of words each with the same number of symbols as the first frame is transmitted. For example, a frame may consist of two hundred and forty bits split into fifteen words with each word consisting of sixteen bits where one bit is a synchronisation bit and the other fifteen am data bits.

It is known that transmission systems use either interleaved or block synchronisation words. An interleaved synchronisation word is, for example, one where one bit within a word is a synchronisation bit and the other bits of that word are data bits and the interleaved synchronisation word is the time ordered collection of the synchronisation bits of the words of the frame transmitted.

Block synchronisation is where one of the words of the transmitted frame is a synchronisation word, i.e. a word comprising synchronisation bits, the other words of the frame being data words, i.e. words comprising data bits.

These transmission systems can be binary or other multivalued transmission systems. For the sake of convenience reference will be made to binary transmission systems but it will be understood that the invention is not limited to binary transmission systems. It will be appreciated that the word "bit" in the examples hereafter refers to a symbol having one of two values but would in other multi-value transmission systems refer to a symbol having one of a number of selected values. By binary is meant data values being one of the set {0,1}.

It will be appreciated that a demultiplexer for the mentioned type of transmission system must be synchronised to the data being received. This involves two processes, synchronising to the transmission, and maintaining synchronisation which may also be termed as detecting a lack of synchronisation.

Synchronising to the transmission requires the identification of the start of the data frame.

Maintaining synchronisation or detecting a lack of synchronisation is necessary to ensure that the data received is interpreted correctly.

However, known pdor synchronisation methods generally deal with only one frame of synchronisation data. The result of this is that when the transmission is corrupted due to noise, re-synchronisation often requires the transmission of many frames before synchronisation is achieved. The invention provides a robust and more efficient synchronisation method.

Prior known methods of detecting a lack of synchronisation are vulnerable to short bursts of interference, typified by fading phenomena, resulting in the need to re-synchronise. Whilst re-synchronisation is occurring the reception of intelligible data is interrupted. The invention provides substantial immunity to short bursts of interference.

It will be appreciated that the two processes, establishing a synchronism state and detecting a lack of a synchronism state, may be performed by the same equipment operating in one of two modes. Each mode corresponds to one of the two processes mentioned above. The process of detecting a lack of synchronism state will be discussed first with the process of establishing a synchronism state being discussed thereafter.

A detailed discussion of the above considerations including a theoretical description of the factors to be considered in overcoming the abovementioned problems has been presented by the author at The Institution of Engineers Australia, Communications Conference held in Melbourne, Australia 16–18 October 1990 entitled 'A DSP Implementation of a Robust Flexible Receiver/Demultiplexer for Broadcast Data Satellite Communications'.

DISCLOSURE OF THE INVENTION

In one aspect, this invention is an apparatus for detection of and providing an output signal indicative of an out of synchronism state of a demultiplexer which is assumed to be initially synchronised for a data transmission system with a known or expected synchronisation bit or pattern. The apparatus includes receiving means for receiving frames of words where each word includes a plurality of bits and each frame includes at least one synchronisation bit and at least one data bit; means for forming a plurality of cross-correlation values the values of which are values of the cross correlation of the value or values of the received bit or bits of at least one frame with value or values of the expected synchronisation bit or bits.

The correlations performed are logic equivalence comparisons where correlating bits return a value of one and non-correlating bits return a value of zero.

In preference, the apparatus includes a cyclic memory buffer for storing the data bits and the synchronisation bits received, and a cross correlation summary buffer for storing the summations of the cross correlations.

For example, it will be appreciated that in the above the size of the frame and the design criteria for robustness to transmission errors due to short bursts of noise will affect the implementation. in general with the invention, robustness and speed of detecting an out of synchronism state are conflicting characterisations as robustness is improved when the number of synchronisation bits used in the synchroniser is increased which corresponds to a reduced speed of detection.

It is desirable that the sum of the cross correlations of synchronisation bits with the actual received synchronisation bits is considerably larger than the sum of the cross correlation of received data with the synchronisation bits. Ideally, in the case of an interleaved binary system, the cross correlation of the synchronisation bits with the received synchronisation bits is one so the summation is equal to the number of synchronisation bits. The sum of the cross correlation of received data with the synchronisation bits, is half the number of synchronisation bits, as the probability of a one is half.

Changes in the synchronisation signal will depend upon the number of synchronisation bits used to detect the out of synchronism state, the greater the number of synchronisation bits the more robust the system to short burst noise but the longer the time before an out of synchronism state is detected. So the selected implementation of the invention will determine the number of synchronisation bits received for the detection of an out of synchronism state and so the number of frames and words.

In another aspect, this invention is a method for detection of and providing an output signal indicative of an out of synchronism state of a demultiplexer which is assumed to be initially synchronised for a data transmission system with a known or expected synchronisation bit or pattern. The method includes the steps of: receiving frames of words where each word includes a plurality of bits and each frame includes at least one synchronisation bit and at least one data bit; forming a plurality of cross-correlation values the values of which are values of the cross correlation of the value or values of the received bit or bits of at least one frame with value or values of the expected synchronisation bit or bits.

It will be appreciated that depending upon the particular embodiment of the invention the synchronisation signal can be compared to a selected threshold value.

Alternatively the threshold value may be a derived value. Cross-correlation of a word of synchronisation bits with the expected synchronisation pattern will result in a maximum cross-correlation value. A word which includes data bits will result in a lower cross-correlation value than the maximum cross-correlation value. An appropriate dedved threshold is the largest of the lower cross-correlation values.

In preference the method includes the step of forming the threshold value by summation of the values of the cross correlation of the received bits of a word, said received bits including data bits, with an expected synchronisation word.

In preference the value of the threshold value is the summation of the values of the cross correlation of one data bit within each word with an expected synchronisation word wherein the one data bit is the same respective data bit in each word.

In preference the value of the threshold value is the maximum value of the individual summation of the values of the cross correlation of same respective data bit within the words with the bits of the expected synchronisation word where each summation corresponds to different data bits within words.

In preference the method is applied to a transmission system where each word has at least one synchronisation bit.

In preference the method is applied to a transmission system where one or more words comprise of synchronisation bits (block synchronisation word).

In preference, the threshold signal is a transformed summation of the values of the cross correlation of same respective data bit within the words with the expected synchronisation word.

If desired the values of the summation of the values of the cross correlation of the same respective data bit within the words with the expected synchronisation word can be multiplied by a gain or scaling value. This can be done to adjust the threshold value in light of prevailing transmission noise conditions or in response to an operator initiated command.

The second process, that of establishing a synchronism state, will now be discussed.

In another aspect, this invention is a method for detection of and providing an output signal indicative of an out of synchronism state of a demultiplexer for a data transmission system and for re-establishing a synchronisation state of the demultiplexer, wherein the data transmission system includes the transmission of bits as repetitive synchronisation words and as data words. The method includes the steps of: receiving frames of words where each word includes a plurality of bits and each frame includes at least one synchronisation bit and at least one data bit; forming a plurality of cross-correlation values the value of which are values of the cross correlation of the value of values of the received bit or bits of at least one frame with value or values of the expected synchronisation bit or bits; where one of the cross correlation values is the result of correlation of a set of received bits assumed to be initially aligned with the synchronisation bits, called the primary cross correlation value and the other cross correlation values are the result of the cross correlation of the expected synchronisation bits with assumed misaligned received bits; comparing the value of the primary cross correlation value with a threshold value; setting the value of the output signal to indicate an out of synchronisation state when the value of the threshold value is greater than the value of the primary cross correlation value; filing a data frame buffer with received bits, the data frame buffer being split into words the length of which equals the length of the data words, and within the data frame buffer are a plurality of possible synchronisation word locations; forming a plurality of pseudo synchronisation words each corresponding to a different first synchronisation bit location within the data frame buffer, one of the pseudo synchronisation words being a match of the synchronisation word transmitted and each other pseudo synchronisation word being different possible cyclic orderings of the bits of the synchronisation word; cross correlating, for each received bit, the received bit and other received bits within the same said possible synchronisation word location with each pseudo synchronisation word; forming summation values each by summing the values of the cross correlations for each pseudo synchronisation word and each possible synchronisation word location the resulting said summation values being stored in a buffer memory, referred to as the synchronisation frame buffer; and selecting the pseudo synchronisation word and possible synchronisation word location corresponding to the greatest summation value in the synchronisation frame buffer as indicating the location of the first synchronisation bit within the data frame buffer.

In another aspect, this invention is an apparatus for establishing a synchronisation state of a demultiplexer for a data transmission system, the data transmission system including the transmission of bits as repetitive synchronisation words and as data words. The apparatus includes: means for forming and filling a data frame buffer with received bits, the data frame buffer being split into words the length of which equals the length of the data words, and within the data frame buffer are a plurality of possible synchronisation word locations; means for forming a plurality of pseudo synchronisation words each corresponding to a different first synchronisation bit location within the data frame buffer and one of the pseudo synchronisation words being a match of the synchronisation word transmitted and each other pseudo synchronisation word being different possible cyclic orderings of the bits of the synchronisation word; calculating means for cross correlating, for each received bit, the received bit and other received bits within the same said possible synchronisation word location with each pseudo synchronisation word; summation means for forming summation values by summing the values of the cross correlations for each pseudo synchronisation word and each possible synchronisation word location, the resulting said summation values being stored in a buffer memory, referred to as the synchronisation frame buffer; and selection means for selecting the pseudo synchronisation word and possible synchronisation word location corresponding to the greatest summation value in the synchronisation frame buffer as indicating the location of the first synchronisation bit within the data frame buffer.

The selected pseudo synchronisation word and the position of the greatest summation of the cross correlation within the synchronisation frame buffer is indicative of the location of the first synchronisation bit within the data frame buffer.

In a preferred form the pseudo synchronisation words are all of equal length with one being the actual synchronisation word and the others being cyclic orderings of the synchronisation word. For example:

pseudo synchronisation word "A" 1,2,3,4 pseudo synchronisation word "B" 4,1,2,3 pseudo synchronisation word "C" 3,4,1,2 pseudo synchronisation word "D" 2,3,4,1 where the pseudo synchronisation word "A" corresponds to the actual synchronisation word in this example. This form is applicable to forward and backward searching which will be further explained hereafter.

In another preferred form, the pseudo synchronisation words are truncated cyclic forms of the actual synchronisation word. For example:

pseudo synchronisation word "A" 1,2,3,4 pseudo synchronisation word "B" 1,2,3 pseudo synchronisation word "C" 1,2 pseudo synchronisation word "D" 1 where the pseudo synchronisation word "A" corresponds to the actual synchronisation word in this example. This form is applicable to forward only searching which will be further explained hereafter.

In another form, the invention may be said to reside, again not necessarily in the broadest or only form, in an apparatus being the combination of the above mentioned apparatus for detection of and providing an output signal indicative of an out of synchronism state of a demultiplexer and the apparatus for establishing a synchronisation state of a demultiplexer.

In another form, the invention may be said to reside, again not necessarily in the broadest or only form, in a method being the combination of the above mentioned method for detecting the state of and providing an output signal indicative of an out of synchronism state of a demultiplexer and the method of establishing a synchronisation state of a demultiplexer.

BRIEF DESCRIPTION OF THE DRAWINGS

The invention will now be described with reference to the accompanying Figures as exhibited by two embodiments.

FIG. 1 is an illustration of an example of a frame with an interleaved synchronisation word;

FIG. 2 is an illustration of an example of a frame with a block synchronisation word and a number of data words;

FIG. 3 is an illustration of a cross correlation summary buffer and dat frame buffer which will be used to illustrate the synchronisation maintenance method;

FIG. 6a shows three example received frames where a synchronisation word is interleaved in the received frames;

FIG. 6b shows the cross correlation values in the synchronisation frame buffer which would result from each of the three frames of example data in FIG. 6a; and FIG. 6c shows the total cross correlation values in the synchronisation frame buffer after receiving the three example data frames in FIG. 6a, clearly showing the matrix in FIG. 6c is the sum of the three matrices in FIG. 6b;

BEST MODE OF CARRYING OUT THE INVENTION

Figure 4A:
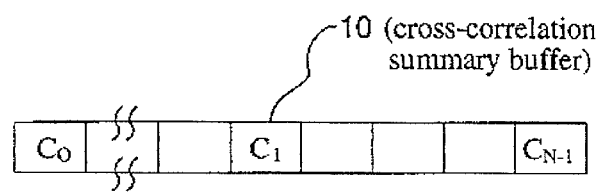
FIG. 4a is an illustration of a series of data frames stored in a cyclic memory buffer called the data frame buffer illustrating the synchronisation maintenance process.

The process is applicable to transmission systems with either or both interleaved and block synchronisation words. The exact form of the synchronisation establishment and maintenance will vary depending on the transmission system.

FIG. 1 illustrates a data frame between p and q with an interleaved synchronisation word where the first bit 1 of each data word (eg a-b, b-c etc) is a synchronisation bit. Each synchronisation bit in sedes starting at the beginning of the frame form the synchronisation word. The synchronisation bit can be located at any position within the data word. The following discussion considers the first bit as the synchronisation bit for simplicity.

FIG. 2 illustrates a data frame between p and q with block synchronisation where the first word (a-b) is the synchronisation word and the other words before the next frame are data words.

Synchronisation Establishment

The following discussion is directed to the application of the method to the interleaved synchronisation case. The method is equally applicable to block synchronisation although some minor changes to the equations may be required. Such changes will be self-evident to a person skilled in the art and to some degree are described in the text following.

It will be appreciated that the problem is to determine the first bit of a data frame from a series of received data but this first bit may occur anywhere in the sedes of received data. It will be appreciated that where a series of received data is of length equal to the size of the frame then the probability of any one of those bits being the first bit of the frame is equal.

The following description will be in respect of L words in each frame and N bits in each word.

To establish synchronisation a memory buffer, called a synchronisation frame buffer, of size L rows of N elements is filled with the result of the cross-correlations. The position which has the highest value is the mostly likely position of the first synchronisation bit of the frame. The start of the frame can then be established relative to that bit location. In this case the synchronisation frame buffer illustrated in FIG. 3 is the same size as the data frame of the incoming data. The synchronisation frame buffer can be considered as a matrix.

Each bit of the received data is cross-correlated with the possible values of the synchronisation word, that is the pseudo synchronisation words. The cross-correlation values are stored in the matrix (synchronisation frame buffer) illustrated in FIG. 3. The values of the elements of the matrix are calculated using:

$$C_{ij} = \sum_{k=0}^{M-(jN+i)} d_{(j+k)N+i} S_{k'} \quad (1)$$

where:

$k' = k$ modulo $L$, $\{s\}$ are the pseudo synchronisation words, that is the synchronisation pattern bits, $d$ = the individual received bits, $N$ = bits per word, $L$ = number of words per frame, and, $M$ = the total number of received bits.

The above formalism refers to the interleaved synchronisation case (FIG. 1). For the block synchronisation case (FIG. 2) the form of the equation would be slightly different. Alternatively equation (1) is used but the received data bits are read into the matrix column-wise rather than row-wise.

The accumulation of the $C_{ij}$'s continues until $M > M_R =$ PNL where P is the number of received frames. That is synchronisation is determined after at least one frame has been received when at which time the location of the $C_{ij}$ value which is the greatest ($C_m$) is selected as being the first synchronisation bit in the frame.

Due to the possible size of the frame being large and hence the value of NL is large the selection of the $C_{ij}$ location $(i_m, j_m)$ with the maximum value ($C_m$) can take considerable time. This can be overcome by continuously monitoring the $C_{ij}$ location $(i_m, j_m)$ with the maximum value ($C_m$) instead of searching the entire matrix for that location.

It will be appreciated that more than one $C_{ij}$ location may have the same value thus making the determination of the first synchronisation bit difficult. This can be substantially overcome by monitoring the $C_{ij}$ location $(i_m, j_m)$ with the maximum value ($C_m$) and the $C_{ij}$ location $(i_{sm}, j_{sm})$ with the second highest value ($C_{sm}$).

Then after $M_R$ bits have been received synchronisation is deemed to have occurred if the maximum value ($C_m$) is greater than the second highest value ($C_{sm}$), i.e. $C_m > C_{sm}$, otherwise cross correlating is continued until this test is satisfied.

In some cases it is preferred that the test $C_m > C_{sm}$ be amended to $C_m > C_{sm} + X$ where X is a constant. This can be used to reduce false synchronisation where the value of $M_R = PNL$ is not large. It will be appreciated that the larger the value of $M_R$ the less likely that two $C_{ij}$ values will or will nearly be the same.

From the above it will be appreciated that generally after a frame has been received, relatively few additional bits are needed to establish the location of the first synchronisation bit.

Then the known offset between the first bit of the frame and the first synchronisation bit can be used to establish the start of the frame or subsequent frames. Once synchronisation is established it is necessary to monitor and maintain synchronisation.

In summary the process of synchronisation may include the following steps:

0) Initialization, $c_m = i_m = j_m = c_{sm} = i_{sm} = j_{sm} = M = 0$;
1) Repeat for j=0 to L-1:
   Repeat for i=0 to N-1:
   Obtain received bit M s.t. $d_{ij = dm}$
   where $i = M \mod N$
   $j = (M-i) \mod L$
   Calculate the cross correlation $c_{ij}$;
   if $c_{ij} \geq c_m$
   then $c_{sm} = c_m$, $i_{sm} = i_m$, $j_{sm} = j_m$, $c_m = c_{ij}$, $i_m = i$, $j_m = j$;
   else,
   if $c_{ij} \geq c_{sm}$
   then $c_{sm} = c_{ij}$, $i_{sm} = i$, $j_{sm} = j$;
   $M = M+1$   If $M \geq M_R$ go to 2;
2) if $c_m = c_{sm}$ go to 1;
3) if $M \neq M_R + j_m N + i_m - Q$   go to 1,
   where Q is the offset between the first bit of the frame and the first synchronisation bit; and,
4) maintain synchronisation.

Figure 5A:
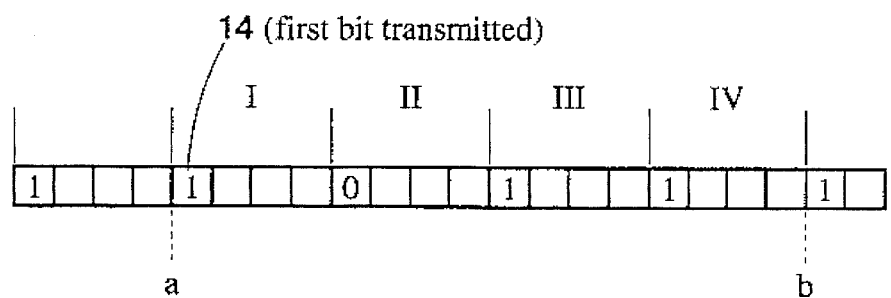
FIG. 5a and 5b are illustrations of a frame transmitted with an interleaved synchronisation word, FIG. 5a showing the ideal situation and FIG. 5b showing a typical situation where the first received bit does not correspond to the first bit of the frame.
Figure 5B:
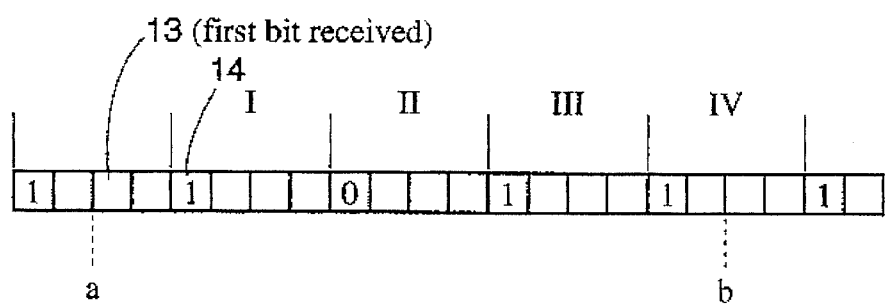
Figures 6A, 6B, 6C:
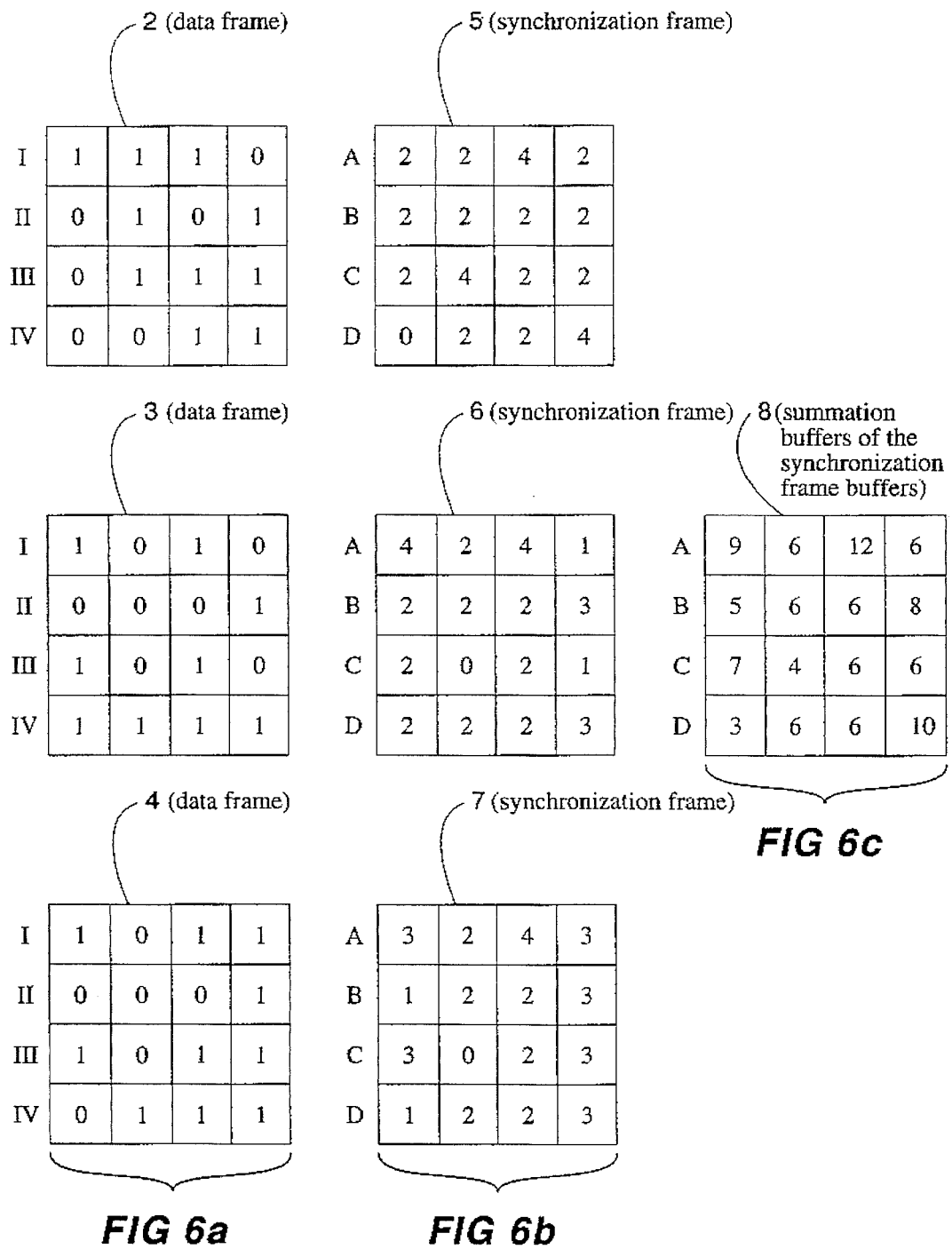

To illustrate the synchronisation process the following example is given which is illustrated in FIGS. 5a, b and c, and FIGS. 6a, 6b and 6c. The data frames 2, 3 and 4 in FIG. 6 compdse four words (I, II, III and IV) each of four;bits within which is interleaved a synchronisation word of four bits illustrated in FIG. 5a for ideal reception and FIG. 5b for typical reception which is where the first bit 13 received is not the first bit 14 of the transmitted frame. The frame in the ideal case is a–b, and in the case illustrated in FIG. 5b the received frame is a'–b'.

Figure 5C:
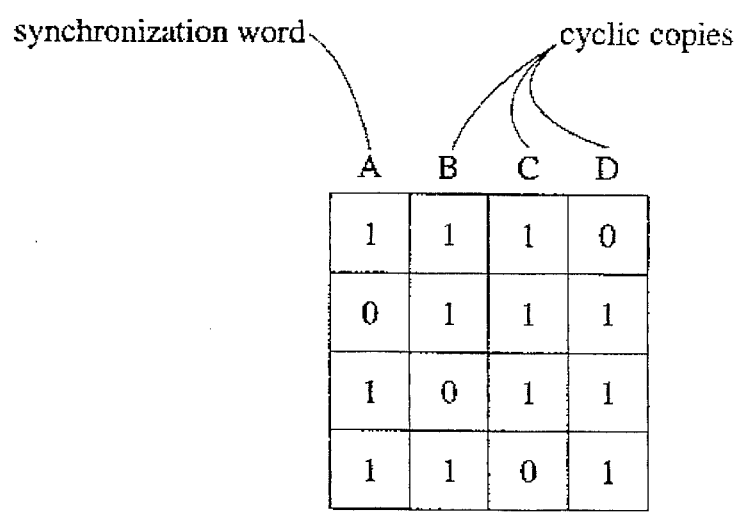
FIG. 5c is an illustration of a series of orderings of a synchronisation word for a synchronisation word interleaved within a data frame.

In FIG. 5c the possible ordering of the synchronisation word is illustrated as A, B, C and D where each is a pseudo synchronisation word for the process of cross correlating. Column A is the actual synchronisation word, that is 1011 in this case, and columns B, C and D are cyclic copies (pseudo-synchronisation words) of the actual synchronisation word A.

FIG. 6 illustrates a forward and backward search. The three data frames 2, and 4 in FIG. 6a illustrate the effect of starting to synchronise somewhere within the data frame. The start of the data frame in this example corresponds to the first bit of the synchronisation word A within the frame but this is actually occurring at location row 1 column 3.

Further, for this example, there is assumed no errors in transmission and that synchronisation is only determined after reception of the number of bits corresponding to an integral number of frames.

For each received frame, a synchronisation frame buffer 5, 6 and 7, a matrix, is formed. Each element of the synchronisation frame buffer corresponds with the cross correlation of each possible location of each pseudo synchronisation word with each column of the received data frame. That is, for pseudo synchronisation word A the value of the cross correlation is placed in the first row of the synch ronisation frame buffer each column thereof corresponding to the possible location of A within the columns of the data frame. For pseudo synchronisation word B the value of the cross correlation is placed in the second row of the synchronisation frame buffer, pseudo synchronisation word C corresponding to the third row, and pseudo synch ronisation word D corresponding to the fourth row.

The summation of the element values of synchronisation frame buffers 5, 6 and 7 is given in matrix 8. As can be seen the value of the first row third column is the greatest indicating the first bit of the synchronisation word. That is, as the synchronisation bit is the first bit within each word and the synchronisation ordedng is that of column A in FIG. 5c, that the first bit of the data frame is that at the first row third column.

The last example is but one form of implementation of the invention but is not the preferred form which is where the size of the data frame is large. With a large frame size it is preferred to test for synchronisation after every received bit once a full frame of bits has been received. It will be appreciated that a "large" frame size is one which results, due to the probability of false detection of bits and also due to the characteristics of the transmission system, in a large correlation property of the synchronisation word compared with the correlation with data, i.e. a large correlation spike and low side lobes. Generally, for binary systems, greater than thirty synchronisation bits are required. Note, in the implementation described four matrix buffers 5, 6, 7 and 8 of FIGS. 6b and 6c are illustrated but it will be appreciated that a single matrix buffer (for example 8 only, may be used if desired.

Synchronisation maintenance

To monitor and maintain synchronisation for the transmission scheme to which synchronisation was established by the process illustrated in FIGS. 5 and 6 a circular buffer 9 of B cross correlation frames is stored as illustrated in FIG. 4. The number B can be selected as desired and if made large enough such that with respect to the transmission rate and frame size the buffer storage time is large compared with the expected fading or burst interference time then loss of synchronisation will be most improbable.

Figure 4B:
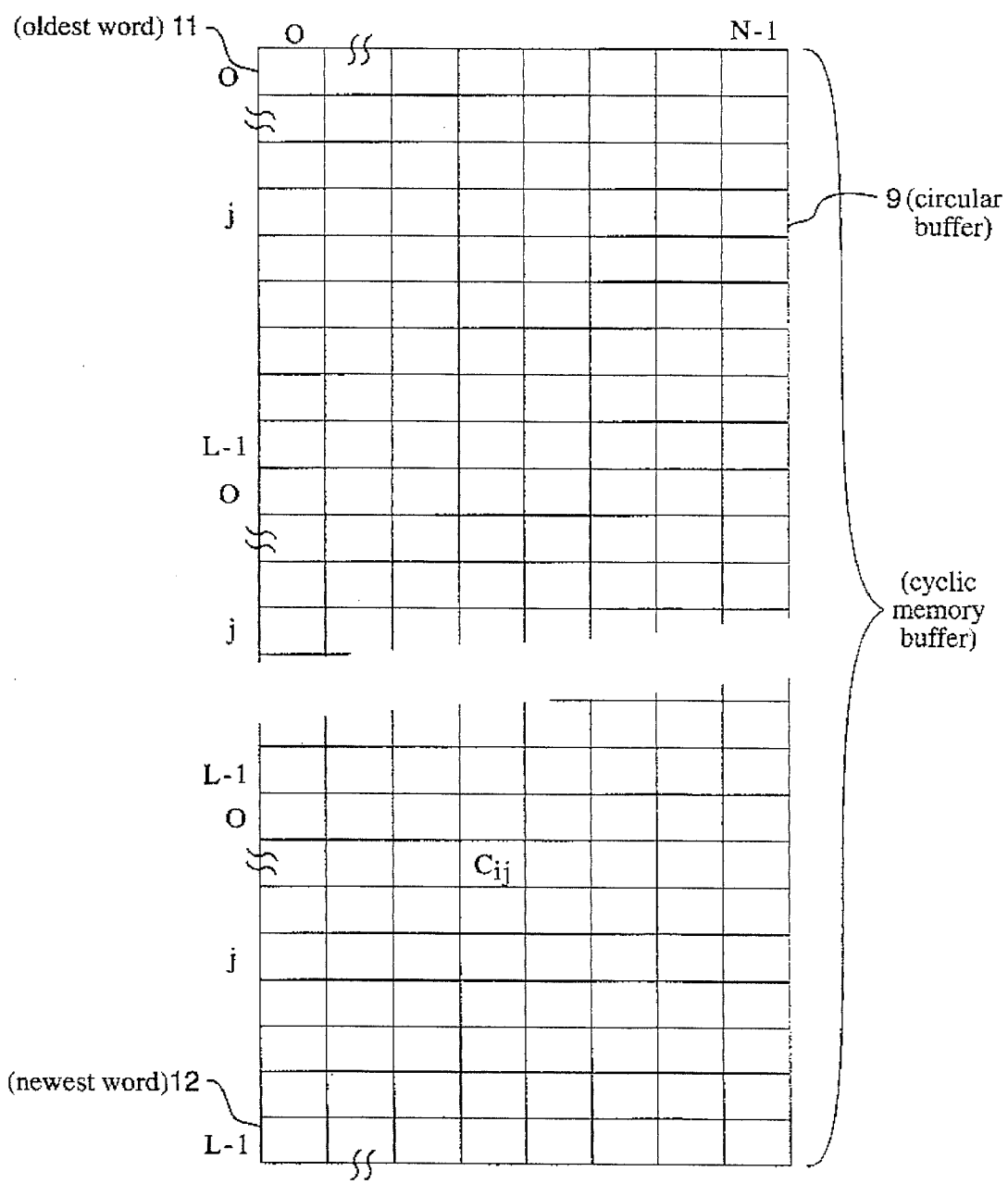
FIG. 4b is an illustration of the cross correlation summary buffer used in the synchronisation maintenance process.

A continuously updated buffer 10, the cross correlation Summary buffer as in FIG. 4b of the summation of the i columns of the B frames is maintained. The cross correlation values of the oldest word 11 being subtracted from the values of the updated buffer 10 and the cross correlation values of the newest word 12 being added to the values of the updated buffer 10.

In general terms the values of the elements of cross correlation Summary buffer 10 can be determined as follows. Let the $r^{th}$ received bit be denoted by $d_r$, then $$d_{ij}=d(i,j)=d_r \text{ where } i=r \bmod N \text{ and } j=r \bmod BL \quad (2)$$

then the values of the buffer elements $C_i$ are:

$$C_i = \sum_{k=0}^{BL-1} d(1,k)S_k, \quad (3)$$

where k'=k mod L and S are the synchronisation pattern bits.

To check for synchronisation the value of buffer element of buffer 10 corresponding to the synchronisation word position $C_P$ usually in the position 0 for convenience, which should be the greatest element value of the buffer 10 is compared with the greatest value of the other element values of the buffer 10. The precise out off synchronism scheme is one of choice and in its simplest form can be when the value of the buffer element of buffer 10 corresponding to the synchronisation word position is less than the greatest value of the other element values of the buffer 10.

It will be apparent that the time taken to detect an out off synchronism situation is dependant upon the scheme used and will effect the noise immunity of the system. In general high immunity to burst noise is offset by a longer time to determine out off synchronism state than low burst noise immunity.

For a binary transmission system where each frame comprises 15 words each of 15 data bits and one synchroni.sation bit and where the size of the buffer 9 corresponds to B being 20 then when no errors are occurring the value of the synchronisation element of buffer 10 would be 300 and the expected values of the other elements would be 150. This is because the average cross correlation value of data should be half that of the synchronisation bit value.

To summarise the synchronisation monitoring process for the case of B being an integer the following is provided where $C_P$ is the value of the element within buffer 10 corresponding to the synchronisation element being elements of the buffer 10 and $r_m$ is a flag which is set once the buffer 9 has been filled with M values:

---

1) initalize elements of buffer 10 to zero,
   $c_i=r=i=j=c_{imax}=i_{max}=d_{ij}=r_m=0$;
   M = minimum number of received bits before a decision can be made, eg 1 frame or greater than fifty synchronisation bits;
2) store $d_r$ in buffer 9 as calculated with equation 2;
3) calculate $c_i$ with equation 3 using the iterative forms and condiflons:
   if r < BLN
   $c_i = c_i^0 + d(i,j) \oplus S_j$
   else
   $c_i = c_i^0 + d(i,j) \oplus S_j - d(i,j-1) \oplus S_{j-1}$
   $c_i^0 = c_i$
   Where    i=r mod N,
              j=r mod BL,
              j-1=(r-1) mod BL,
              $c_i$ = current element,
              $c_i^0$ = old element from previous evaluation;
              $\oplus$ = modulo 2 addition;
4) if i≠p then
      if $c_i > c_{imax}$
         $c_{imax}=C_i$
         $i_{max}=i$
5) if $r_m=1$
      if $c_p \leq c_{imax}$
         re-establish synchronization
   else
      r=M
      $r_m=1$
6) increment r and i, j as per step 3; and,
7) go to 2.

---

It will be appreciated that the above summary is for the simplest out off synchronism scheme as already mentioned and if other schemes are to be used then the condition specified in step 5 can be modified accordingly.

Figure 7A:
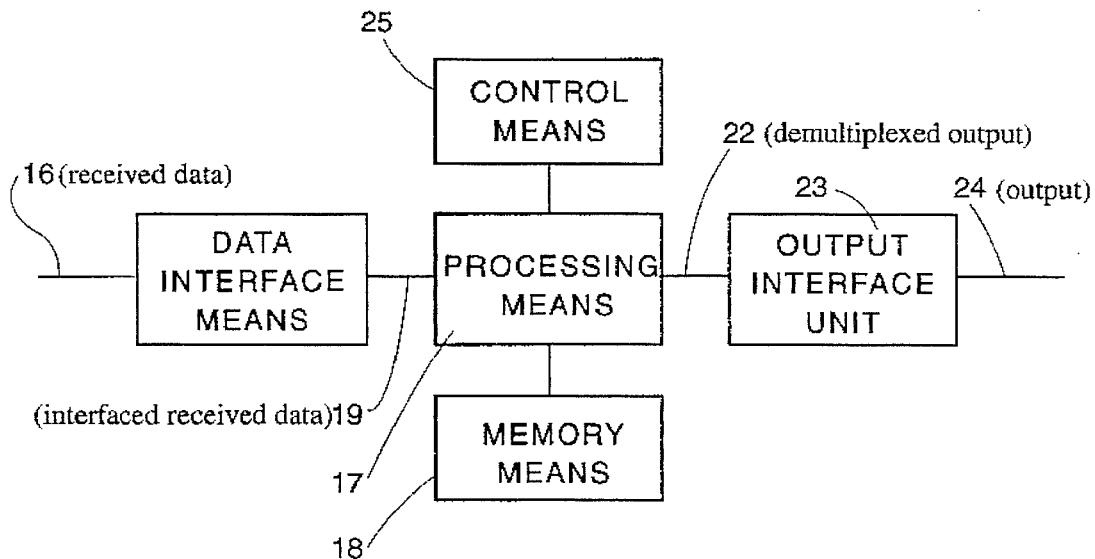
FIG. 7a shows a block diagram of an apparatus including input and output interfaces, the processing means, and control and memory functions which could be used to implement the method.
Figure 7B:
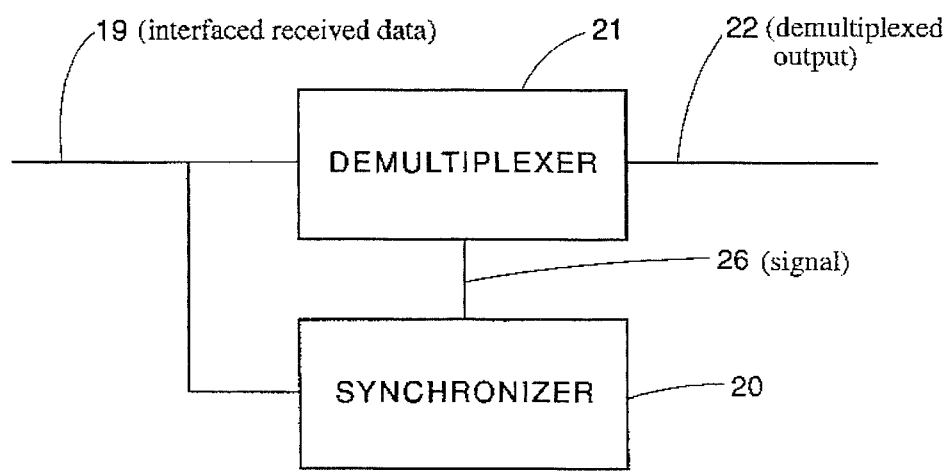
FIG. 7b shows a block diagram of the relationship between the synchroniser and the demultiplexer means.

The above synchronisation and monitoring processes can be implemented using an apparatus as illustrated in block diagram form in FIGS. 7a and b. The apparatus includes a data interface means 15 adapted to interface the received data 16 before inputting it 19 into processing means 17. Memory means 18 is adapted to store the matdces and buffers, and also method instructions.

The processing means 17 is adapted to perform the processes of synchroniser 20 and demultiplexer 21. The demultiplexed output 22 is supplied to an output interface unit 23 and the output 24 is supplied to subsequent data processing equipment.

A control means 25 is provided to allow user control of the processing means 17.

It will be appreciated that the processing means 17 preforms the functions of synchronisation 20, detecting out of synchronism and demultiplexing the received bits 21. A signal 26 is used to indicate when synchronisation has been achieved.

Specific hardware and software details will be apparent to the skilled addressee. In one preferred form, dependant upon the specific application requirements, the particular individual functions can be performed using known computer and receiver technology.

Throughout this specification the intention has been to illustrate the general nature of the invention without limiting the invention to any particular detail of any embodiment described.

A skilled addressee would be able to conceive a number of embodiments of the invention not disclosed herein and as such all would fall within the spidt of this invention.

I claim:

1. A method of establishing a synchronisation state of a demultiplexer for a data transmission system, the data transmission system including the transmission of bits as repetitive synchronisation words and as data words, the method comprising the steps of:

filing a data frame buffer with received bits, the data frame buffer being split into words the length of which equals the length of the data words, and within the data frame buffer are a plurality of possible synchronisation word locations;

forming a plurality of pseudo synchronisation words each corresponding to a different first synchronisation bit location within the data frame buffer, one of the pseudo synchronisation words being a match of the synchronisation word transmitted and each other pseudo synchronisation word being different possible cyclic orderings of the bits of the synchronisation word;

cross correlating, for each received bit, the received bit and other received bits within the same said possible synchronisation word location with each pseudo synchronisation word;

forming summation values each by summing the values of the cross correlations for each pseudo synchronisation word and each possible synchronisation word location the resulting said summation values being stored in a buffer memory, referred to as the synchronisation frame buffer, and selecting the pseudo synchronisation word and possible synchronisation word location corresponding to the greatest summation value in the synchronisation frame buffer as indicating the location of the first synchronisation bit within the data frame buffer.

2. The method of claim 1 wherein the pseudo synchronisation words are all of equal length.

3. The method of claim 1 wherein the pseudo synchronisation words are truncated cyclic forms of the actual synchronisation word.

4. An apparatus for establishing a synchronisation state of a demultiplexer for a data transmission system, the data transmission system including the transmission of bits as repetitive synchronisation words and as data words, the apparatus comprising:

means for forming and filling a data frame buffer with received bits, the data frame buffer being split into words the length of which equals the length of the data words, and within the data frame buffer are a plurality of possible synchronisation word locations;

means for forming a plurality of pseudo synchronisation words each corresponding to a different first synchronisation bit location within the data frame buffer and one of the pseudo synchronisation words being a match of the synchronisation word transmitted and each other pseudo synchronisation word being different possible cyclic orderings of the bits of the synchronisation word;

calculating means for cross correlating, for each received bit, the received bit and other received bits within the same said possible synchronisation word location with each pseudo synchronisation word;

summation means for forming summation values by summing the values of the cross correlations for each pseudo synchronisation word and each possible synchronisation word location, the resulting said summation values being stored in a buffer memory, referred to as the synchronisation frame buffer; add selection means for selecting the pseudo synchronisation word and possible synchronisation word location corresponding to the greatest summation value in the synchronisation frame buffer as indicating the location of the first synchronisation bit within the data frame buffer.

5. A method for detection of and providing an output signal indicative of an out of synchronism state of a demultiplexer for a data transmission system and for re-establishing a synchronisation state of the demultiplexer, wherein the data transmission system includes the transmission of bits as repetitive synchronisation words and as data words, the method comprising the steps of:

receiving frames of words where each word includes a plurality of bits and each frame includes at least one synchronisation bit and at least one data bit;

forming a synchronisation signal the value of which is the sum of the values of the cross correlation of the value of values of the received synchronisation bit or bits of a frame of frames with the expected value of the respective bit or bits;

comparing the value of the synchronisation signal with the value of a threshold signal;

setting the value of the output signal to indicate an out of synchronisation state when the value of the threshold value is greater than the value of the synchronisation signal;

filing a data frame buffer with received bits, the data frame buffer being split into words the length of which equals the length of the data words, and within the data frame buffer are a plurality of possible synchronisation word locations;

forming a plurality of pseudo synchronisation words each corresponding to a different first synchronisation bit location within the data frame buffer, one of the pseudo synchronisation words being a match of the synchronisation word transmitted and each other pseudo synchronisation word being different possible cyclic orderings of the bits of the synchronisation word;

cross correlating, for each received bit, the received bit and other received bits within the same said possible synchronisation word location with each pseudo synchronisation word;

forming summation values each by summing the values of the cross correlations for each pseudo synchronisation word and each possible synchronisation word location the resulting said summation values being stored in a buffer memory, referred to as the synchronisation frame buffer; and selecting the pseudo synchronisation word and possible synchronisation word location corresponding to the greatest summation value in the synchronisation frame buffer as indicating the location of the first synchronisation bit within the data frame buffer.

6. An apparatus for detection of and providing an output signal indicative of an out of synchronism state of a demultiplexer for a data transmission system and for re-establishing a synchronisation state of the demultiplexer, wherein the data transmission system includes the transmission of bits as repetitive synchronisation words and as data words, the apparatus comprising:

receiving means for receiving frames of words where each word includes a plurality of bits and each frame includes at least one synchronisation bit and at least one data bit;

means for forming a synchronisation signal the value of which is the sum of the values of the cross correlation of the value or values of the received synchronisation bit or bits of a frame or frames with the expected value of the respective bit or bits;

means for comparing the value of the synchronization signal with a threshold value;

output means for setting the value of the output signal to indicate an out of synchronisation state when the value of the threshold value is greater than the value of the synchronization value;

means for forming and filling a data frame buffer with received bits, the data frame buffer being split into words the length of which equals the length of the data words, and within the data frame buffer are a plurality of possible synchronisation word locations;

means for forming a plurality of pseudo synchronisation words each corresponding to a different first synchronisation bit location within the data frame buffer and one of the pseudo synchronisation words being a match of the synchronisation word transmitted and each other pseudo synchronisation word being different possible cyclic orderings of the bits of the synchronisation word;

calculating means for cross correlating, for each received bit, the received bit and other received bits within the same said possible synchronisation word location with each pseudo synchronisation word;

summation means for forming summation values by summing the values of the cross correlations for each pseudo synchronisation word and each possible synchronisation word location; the resulting said summation values being stored in a buffer memory, referred to as the synchronisation frame buffer, and selection means for selecting the pseudo synchronisation word and possible synchronisation word location corresponding to the greatest summation value in the synchronisation frame buffer as indicating the location of the first synchronisation bit with the data frame buffer.

* * * * *